United States Patent
Newberth, III et al.

[11] Patent Number: 5,135,663
[45] Date of Patent: Aug. 4, 1992

[54] METHOD OF TREATING (METH)ACRYLIC MONOMER-CONTAINING WASTEWATER

[75] Inventors: Frederick F. Newberth, III, Hartford; Albert J. Henrikson, Meriden; Lawrence B. Joffee, Seymour; Calliope Artavanis-Tsakonas, Hamden; Edward K. Welch, II, Bristol, all of Conn.

[73] Assignee: Loctite Corporation, Hartford, Conn.

[21] Appl. No.: 779,229

[22] Filed: Oct. 18, 1991

[51] Int. Cl.⁵ .......................... C02F 1/70; C02F 1/58; C02F 1/56

[52] U.S. Cl. .................... 210/719; 210/724; 210/725; 210/726; 210/727; 210/734; 210/757; 210/765; 210/805; 210/702

[58] Field of Search ............... 210/702, 719, 724, 725, 210/726, 727, 734, 738, 708, 805, 749, 757, 765; 524/845

[56] References Cited

U.S. PATENT DOCUMENTS

| | | | |
|---|---|---|---|
| 32,240 | 9/1986 | De Marco | 526/328 |
| 3,672,942 | 6/1972 | Neumann et al. | 117/62.2 |
| 3,719,572 | 3/1973 | Burke, Jr. | 204/159.15 |
| 3,969,552 | 7/1976 | Malofsky et al. | 427/295 |
| 4,147,821 | 4/1979 | Young | 427/340 |
| 4,221,634 | 9/1980 | Frost | 162/190 |
| 4,278,582 | 7/1981 | Miller | 210/749 |
| 4,326,912 | 4/1982 | Mollett | 210/702 |
| 4,391,686 | 7/1983 | Miller et al. | 204/159.15 |
| 4,416,921 | 11/1983 | Dunn | 427/353 |
| 4,533,446 | 8/1985 | Conway et al. | 204/159.24 |
| 4,556,701 | 12/1985 | Schindler et al. | 526/282 |
| 4,632,945 | 12/1986 | Garcia et al. | 523/176 |
| 4,668,712 | 5/1987 | Hino et al. | 522/13 |
| 4,674,980 | 6/1987 | Ibsen et al. | 433/228.1 |
| 5,006,233 | 4/1991 | Muisener | 210/96.1 |

FOREIGN PATENT DOCUMENTS 2705169 8/1978 Fed. Rep. of Germany.
50-47237 4/1975 Japan.

OTHER PUBLICATIONS

Product Brochure LT-969, "Introducing L.I.S./Loctite Impregantion Systems," 16 pages, copyright 1985, Loctite Corporation.
"Gas Chromatographic Determinatin of the Impurity Composition in Waste Waters and Regenerated Waters During the Synthesis of Polystyrene Plastics with a Closed Water Recycling System". Plasticheski Massy, 1984, No. 4, pp. 49-50.

Primary Examiner—Stanley S. Silverman
Assistant Examiner—Neil M. McCarthy
Attorney, Agent, or Firm—Steven J. Hultquist

[57] ABSTRACT

A method of treating wastewater containing (meth)acrylic monomer, such as is produced by aqueous washing of porous parts impregnated with a sealant composition containing such monomer. The monomer-containing wastewater is (1) adjusted in pH to a value in the range of from about 8 to about 10, and (2) contacted with an effective amount of a reducing agent which is polymerizingly effective for the monomer, to yield corresponding polymer from the monomer. The wastewater is mixed with a cationic flocculating agent in sufficient quantity to flocculate the polymer in the wastewater, and the resulting wastewater is physically separated to recover a monomer- and polymer-reduced wastewater effluent which may be discharged to receiving waters.

19 Claims, 1 Drawing Sheet

FIG. 1

METHOD OF TREATING (METH)ACRYLIC MONOMER-CONTAINING WASTEWATER

CROSS-REFERENCE TO RELATED APPLICATION

Co-filed herewith is a related application, U.S. application Ser. No. 07/778,559, filed on even date herewith in the names of Edward K. Welch, II and Frederick F. Newberth, III for "METHOD OF TREATING WASTEWATER CONTAINING HEAT-CURABLE (METH)ACRYLIC MONOMER COMPOSITION", and assigned to the assigne hereof.

BACKGROUND OF THE INVENTION

1. Field of the Invention

The present invention relates to a system for treatment of an aqueous medium containing (meth)acrylic monomer, as for example wastewater produced by rinse removal from impregnated porous parts of excess amounts of a (meth)acrylic monomer-based impregnant composition which is curable under anaerobic conditions (i.e., in the substantial absence of oxygen) by free radical polymerization in the presence of a suitable initiator.

2. Description of the Related Art

Impregnation sealing of porosity in porous parts frequently is carried out by introducing sealant compositions into the porosity under a pressure differential, by wet vacuum and dry vacuum techniques which are well known in the art.

Impregnation sealing of porosity may also be carried out by wicking, wherein the impregnation sealant is flowed across the surface of the porous part and allowed to wick into the voids thereof, during a selective period of time. Once the wicking action is completed, the impregnated parts are washed to remove excess surface impregnant. With certain parts, wicking may be enhanced by creating a vacuum inside a cavity within the part. For example, with large parts such as engine blocks, which may not be able to be accommodated by conventional wet vacuum and dry vacuum systems, all but one of the ports or openings into the interior of the engine block is closed off, followed by attachment of a vacuum pump to the remaining port. After the vacuum pump is actuated, air will attempt to enter the engine block through the voids or pores in the porous metal constituting the engine block. The resulting vacuum and air flow will carry any resins which are applied to the surface of the metal part into the porosity thereof.

The sealant compositions typically employed in the aforementioned impregnation applications include a wide variety of self-curing anaerobic sealants, which are curable via freeradical polymerization in the presence of suitable free-radical initiators, e.g., peroxy-type initiators, as well as thermal- [curing sealants, and sealants which cure by both anaerobic and heat cure mechanisms.

Illustrative of the (meth)acrylic monomer-based anaerobic impregnant compositions known in the art are the compositions described in U.S. Pat. Nos. 3,672,942; 3,969,552; Reissue 32,240; and 4,632,945.

Once the impregnant composition is introduced into the porosity of the parts to be sealed, the parts are transferred to an agitated water rinse zone for removal of any remaining surface accumulations of sealant or extraneous sealant which is trapped in blind holes of the impregnated parts. After removal of the excess sealant in the agitated water rinse zone, the impregnated parts are passed to a tank containing a catalyst activator solution which serves to cure the sealant composition at the entrance of the porosity. This creates a hardened plug or cap in the outer portion of the pores, trapping the remaining resin for anaerobic self-cure.

In order to maximize excess sealant removal action in the rinse step, clean make-up water is introduced to the rinse tank either continuously or in batch fashion, with corresponding discharge of monomer-containing aqueous medium from such tank as wastewater effluent. The agitated water rinse washing of the impregnated parts to remove excess sealant material therefrom results in the sealant passing into the aqueous washing medium. The impregnant compositions containing (meth)acrylic monomer are substantially insoluble in the aqueous washing medium, and thus form a dispersion or emulsion of the (meth)acrylic monomer in the wash water.

In conventional impregnation systems utilizing (meth)acrylic monomer-based sealant compositions, the monomer content of the wastewater discharged from the aqueous rinse step may be on the order of from about 0.01 percent to about 8-10 percent by weight (based on the weight of wastewater), or even higher, with concentrations of 0.1-3 percent typically being encountered.

Current legislative and environmental considerations dictate that the wastewater be treated to remove its monomer content. It is desirable for any such treatment of the wastewater to be consistent and effective. Biological treatment, while widely employed for wastewater purification, has the disadvantage that changes in environmental conditions, particularly temperature, may adversely affect the population dynamics and stability of the biomass employed in the wastewater treatment process, thereby lowering the biological activity of the microorganisms effecting treatment. Further, the formulation of the impregnant composition may change with time, and a biomass or microbial population which is efficacious in the treatment of one composition may be deficient or even useless for treatment of wastewater having a different composition.

Prior copending application Ser. No. 07/526,429 of C. M. Muisener and E. K. Welch filed May 18, 1990 for "POROUS ARTICLE IMPREGNATION RESIN COMPOSITION, AND SYSTEM FOR TREATING IMPREGNATION PROCESS WASTE WATER," describes a method of treating the wastewater produced by aqueous washing of impregnated porous articles to remove excess impregnant therefrom. In the method disclosed in this application, the impregnant comprises a curable composition containing (meth)acrylate monomer and initiator species, including a first initiator for heat-cure and/or anaerobic cure (polymerization) of the (meth) acrylate monomer, and a second, actinic radiation photoinitiator for photopolymerization of the monomer. The impregnant also contains an agglomerating agent which is agglomeratingly effective for the (meth)acrylic monomer and/or corresponding polymer in aqueous medium. In this wastewater treatment process, at least a portion of the monomer-containing wastewater is exposed to actinic radiation polymerizingly effective for the monomer in the presence of the photoinitiator, to form corresponding polymer from the monomer; the agglomerating agent facilitates the aggregation of the monomer and/or resulting polymer, to enhance the efficacy of the process. By such treatment, the polymer is susceptible to recovery from the effluent by conventional physical separation methods, such as filtration.

In the practice of the wastewater treatment method in the above-described application Ser. No. 07/526,429, the actinic radiation employed for polymerization of the monomer in the wastewater typically has a very limited depth, e.g., about two inches or less. Accordingly, the effluent liquid must be treated in a thin film, so that the source of actinic radiation provides effective irradiation of the entire mass of the wastewater undergoing treatment. Moreover, any pigments, colorants, fillers, etc., which introduce turbidity, opacity, or otherwise attenuate the actinic radiation transmissivity of the wastewater can severely adversely affect the treatment efficiency, and result in an effluent which does not meet legislative or regulatory constraints, or which is otherwise unsuitable for discharge to final receiving waters.

U.S. Pat. No. 4,130,674 issued Dec. 19, 1978 to W. J. Roberts et al describes the treatment of water used to trap oversprayed coating materials in spray booths which are utilized in the spray application of paints, lacquers, and organic finishes. Such spray booths use water curtains, which collect in a bottom water reservoir for discharge; raw coating material accumulates in such installations, resulting in blockage of pipes and pumps which circulate the water. The patent describes a composition which is added to the spray booth water, comprising a mixture of (i) a long carbon chain surface-active nitrogen derivative containing at least one $C_8$ hydrocarbon chain, and at least one member selected from the class consisting of (ii) a polyvalent water-soluble or dispersible metal salt, and (iii) a nonionic or anionic high molecular weight polymer. The foregoing components are employed as a solution which is added to the spray booth water so that such water contains from about 0.05 percent to about 2 percent of the solution. The patent describes pH adjustment of the spray booth water. Such treatment is said to convert a wide variety of paints to an "ecologically harmless sand-like waste" (column 3, line 40) so that clear water is provided for recycling in the spray booth system.

U.S. Pat. No. 2,029,961 issued Feb. 4, 1936 to O. M. Urbain describes a method of removing carboxylic acids of the formula:

from water in which such carboxylic acids are in solution. The disclosed process entails optional pH adjustment of the solution to below pH 7, following which an acidic amine salt reagent is added to the solution and agitated for a brief period. Suitable acidic amine salt reagents include salts of amino acids, i.e., salts of the acid and/or amine parts of the molecule. The acidic amine salt reagent reacts with the carboxylic acid to form addition compounds "that are either unobjectionable or insoluble and removable by sedimentation" (column 1, lines 10-11).

U.S. Pat. No. 4,530,768 issued Jul. 23, 1985 to K. Tanihara et al describes the treatment of wastewater containing iron-cyanide complexes including ferricyanides, in which the wastewater is treated with a combination of a sulfite and a thiosulfate as a reducing agent. This effects reduction of the ferricyanide ions and the precipitation of ferrocyanide ions in the form of zinc ferrocyanide. The combination of a thiosulfate with a sulfite reducing agent is said to synergistically enhance the reducing activity of the composition. In its background section, this patent references Japanese Patent Publication Number 57-5598, which teaches reducing ferricyanide compounds in wastewater, in the presence of zinc ions, using reducing agents such as thiosulfates, sulfites, pyrosulfites, dithionites, salts of hydrazine, salts of hydroxylamine, and the like (column 2, lines 5-8).

U.S. Pat. No. 4,326,912 issued Apr. 27, 1982 to C. C. Mollett describes the removal of contaminants such as adhesives or ink particles from wastepaper pulp, in which a monomer is dispersed in the pulp to form beads or droplets which take up the impurity species, following which the monomer is polymerized and the resulting polymeric particles are physically separated, such as by screening. Prior to the polymerization, oxygen preferably is removed from the monomer phase, as for example by nitrogen displacement, so that polymerization is not later inhibited. The ratio of monomer to liquid (e.g., water) may be in the range of 1:100 to 1:200 by volume. The initiator is added in an amount which may be on the order of about 1 percent by weight of the monomer. Initiators for the polymerization reaction are described as including organic peroxides and hydroperoxides, and azoisobisbutyronitrile. Useful accelerators include those based on substituted amines and anilines.

U.S. Pat. No. 4,851,130 issued Jul. 25, 1989 to R. D. May, describes the removal of oxygen from an aqueous system by erythorbic acid, erythorbate, ascorbic acid, or ascorbate, with the aid of activated carbon. The system is said to be useful in aqueous systems such as boiler feed water and oil well injection water. In its background section, this patent references Meyers et al U.S. Pat. No. 4,627,921 as disclosing the deoxygenation of water at ambient temperature by passing the water with a reducing agent through an adsorbent, absorbent bed which may be made of activated carbon. The reducing agent may be hydrazine, morpholine, sodium sulfite, or sodium acid sulfite. In the process of the May patent, the oxygen-containing system preferably is contacted with the oxygen scavenger prior to contacting with the activated carbon. The patent describes the oxygen scavenger as preferably being a soluble salt of erythorbic acid such as ammonium, sodium, potassium, calcium or zinc erythorbate, with sodium erythorbate monohydrate being particularly preferred.

U.S. Pat. No. 4,278,582 issued Jul. 14, 1981 to J. R. Miller, describes the removal of acrylonitrile from an aqueous medium. The reactive substance is selected from the group consisting of ammonia, ammonium hydroxide, thioalcohols, hydrogen sulfide and its salts, alkali metal and alkaline earth metal carbonates, phosphates, silicates, and mixtures thereof. The patent discloses that the aqueous reaction medium for polymerization of acrylonitrile may contain co-monomer species which are polymerized with the acrylonitrile, such as alkyl acrylates. The patent describes the acrylonitrile polymerization reaction as involving free radical catalysts such as peroxygen compounds, azo compounds, and the like. Alkali metal and ammonium persulfate catalysts are said to be usefully employed by themselves or in activated redox systems. The reaction of acrylonitrile with the reactive substance is carried out in an agitated system, at a temperature of from about 0° C. to 90° C., with the acrylonitrile reaction being favored by increasing temperature.

Japanese patent application number 50-47237 filed Apr. 17, 1975 and published Oct. 25, 1976, in the name of Takeshi Hyrayana, et al. describes a method for treating eluted waste liquids containing high molecular weight photosensitive resins and low molecular weight reaction monomers. A polymerization initiator is added to the eluted waste liquid, and the liquid is subjected to heat or light to cause the monomers therein to react. The reaction product waste liquid then is passed to a concentration tank, from which it is repeatedly circulated through an ultrafiltration apparatus, until the liquid is concentrated by a factor of 10-15 in the concentration tank. During the ultrafiltration processing of the waste liquid, a filtrate is produced which is reused in the concentration tank until a predetermined concentration in the concentration tank is achieved, at which time the ultrafiltration apparatus is shut down. Thereafter, the concentrated waste liquid is mixed with heavy or light oil, and subjected to combustion treatment.

West German Offenlegungsschrift 27 05 169 published Aug. 10, 1978 in the name of Dr. Hansjochen Schultz - Valtz, discloses a process for treating wastewaters containing about 15-80% by weight of emulsified polymerizable liquid substances. In this process, 0.1-10 weight percent polymerization initiators, based on the total weight of wastewater, are added to the wastewater. The polymerization is carried out at temperatures of between 0° C. and 180° C. and pressures up to 10 bar, followed by separation of the polymerization products from the water. This publication discloses the use of polymerization initiators such as peroxides and/or hydroperoxides, and the use of polymerization accelerators, such as tertiary amines, organic cobalt, and vanadium salts. The process disclosed in this publication is described as being applicable to treatment of wastewater from impregnation of metal castings with unsaturated polyesters. (Meth)acrylic esters are also disclosed as polymerizable emulsified monomers to which the disclosed process is applicable.

U.S. Pat. No. 4,147,821 issued Apr. 3, 1979 to P. D. Young describes a composition for impregnating porous articles such as metal castings. The disclosed impregnant composition includes a monomer system, such as mixtures of monofunctional and polyfunctional (meth)acrylic esters, in combination with a peroxy catalyst and an inhibitor (column 3, lines 1-21). The patent discloses that "[i]t may be convenient to include emulsifying agents (which term includes wetting agents and detergents) in the impregnant as an aid to subsequent water washing." The patent specification refers to effluent disposal problems associated with the use of the impregnant composition. The patentee discloses that when the level of emulsified impregnant has built up to a concentration of 1-5 percent, the wash liquid may be pumped to a separate tank and heated as for example at 100° C. for two minutes to polymerize the composition and precipitate same ("on cooling, the nearly clear supernatant liquid may be drained into the sewer leaving a damp granular solid which, being a polymer, may be disposed of as an inoffensive almost odorless solid waste"). The patent states that the curdling (polymerization) may take twenty minutes at 90° C.

It is an object of the present invention to provide a treatment process for wastewater, e.g., wash water resulting from rinsing of porous parts impregnated with (meth)acrylic monomer-based sealants, which is adaptable to remove (meth)acrylic monomers therefrom in a simple, effective, and economical manner.

It is a further object of this invention to provide such a wastewater treatment process which works effectively over a range of resin strengths in a readily controllable and reliable manner.

Other objects and advantages of the invention will be more fully apparent from the ensuing disclosure and appended claims.

SUMMARY OF THE INVENTION

The present invention relates broadly to a method of treating wastewater containing (meth)acrylic ester monomer, such as for example is produced by aqueous rinsing of porous parts impregnated with anaerobically self-curable (meth)acrylic monomer-based sealants. As used herein the term "(meth)acrylic" refers to acrylic and/or methacrylic species.

In the method of the invention, the (meth)acrylic monomer-containing wastewater is (1) adjusted in pH to a value in the range of from about 8 to about 10, by addition of base to the wastewater, and (2) contacted with an effective amount, e.g., from about 0.01% to about 2%, based on the weight of the wastewater, of a reducing agent which is polymerizingly effective for the monomer, to yield corresponding polymer from the monomer. The resulting polymer may be separated from the wastewater by conventional separation means, e.g., filtration.

The specific sequence of performance of steps (1) and (2) is not critical to the method of the present invention, and step (1) may be carried out prior to, concurrently with, or subsequent to the performance of step (2), as desired or otherwise suitable in a given application, subject to the proviso that step (1) preferably is carried out prior to substantial (e.g., >15%) polymerization of the monomer.

Once the polymer is formed from the monomer to the desired extent, a flocculating agent, e.g., a cationic flocculating agent, may be mixed with the wastewater, in sufficient quantity to flocculate the polymer in the wastewater.

The polymer-containing wastewater finally is physically separated, to recover a monomer- and polymer-reduced waste effluent, which may be passed to receiving waters, or to further treatment, as desired.

As a further, optional feature, de emulsifiers may be employed to treat the wastewater prior to the occurrence of substantial polymerization, to improve the efficiency and efficacy of the wastewater treatment process, particularly when surfactants or emulsifying agents are employed in the impregnant composition in the first instance.

The sequence of carrying out such de-emulsification treatment (relative to the pH-adjustment and reducing agent treatment steps) also is not critical in the broad practice of the present invention, provided that de-emulsification treatment is carried out prior to substantial polymerization of the monomer in the wastewater. For example, de-emulsification of the wastewater may be carried out either prior or subsequent to an initial pH-adjustment step, before the treatment of the waste water with the reducing agent.

In the treatment of the monomer-containing wastewater with the reducing agent, any of a wide variety of reducing agents which are polymerizingly effective for the (meth)acrylic monomer may be employed. Preferably, the reducing agent is selected from the group consisting of:

(i) erythorbic acid, and salts and derivatives thereof;

(ii) ascorbic acid, and salts and derivatives thereof;
(iii) thiourea; and
(iv) sulfite compounds.

Similarly, the flocculating agent may comprise any suitably efficacious material, but desirably comprises a cationic flocculant, e.g., a cationic polyacrylamide.

In a preferred aspect, the physical separation of the polymer-containing wastewater comprises filtration, such as filtration of the polymer-containing wastewater with a rotary vacuum filter.

In another aspect of the invention, a portion of the monomer- and polymer-reduced wastewater effluent may be advantageously recirculated for use as a rinsing medium for the washing of impregnated porous parts in a porosity impregnation process system, provided that any residual reducing agent in the recycle portion of the wastewater effluent is first removed therefrom, such as by reaction with hydrogen peroxide, sodium hypochloride, or oxygen-containing gas.

In another aspect of the invention, a portion of the monomer- and polymer-reduced wastewater effluent may be recycled to the wastewater being contacted with the reducing agent, to maintain a predetermined concentration of reducing agent in such contacting step.

Another aspect of the invention relates to an integrated process for impregnating the porosity of porous parts with a sealant composition comprising (meth)acrylic monomer, and treating the (meth)acrylic monomer-containing wastewater resulting from aqueous washing of the impregnated porous parts, in the manner broadly described hereinabove.

Other aspects and features of the invention will be more fully apparent from the ensuing disclosure and appended claims

DETAILED DESCRIPTION OF THE INVENTION, AND PREFERRED EMBODIMENTS THEREOF

The present invention is based on the surprising and unexpected discovery that aqueous media containing (meth)acrylic ester monomer(s)—e.g., (meth)acrylic monomer-containing wastewater produced by aqueous rinsing of porous parts which have been impregnated with an anaerobic self-curing (meth)acrylic monomer-containing impregnant composition—can be effectively treated to substantially remove the monomer content thereof with only a very small amount of a reducing agent, when the aqueous medium is adjusted in pH to a value in the range of from about 8 to about 10. The resultingly treated aqueous medium may then be mixed with an effective amount of a flocculating agent, to produce an aqueous medium which can be readily physically separated by conventional physical separation techniques, such as filtration, to yield a monomer- and polymer-reduced aqueous medium suitable for discharge to receiving waters.

The reducing agent employed in the broad practice of the present invention may be of any suitable type, as for example including: hydrazine; chlorite and hypochlorite compounds; sulfite; thiosulfates; pyrosulfite; dithionites; hydroxylamine salts; hydrazine salts; erythorbic acid, and salts and derivatives thereof; ascorbic acid, and salts and derivatives thereof; thiourea; morpholine; etc.

Preferably, the reducing agent is selected from the group consisting of: erythorbic acid, and salts and derivatives thereof; ascorbic acid, and salts and derivatives thereof; thiourea; and sulfite-based compounds; as well as mixtures containing two or more of such materials.

Although reducing agents have been employed at high concentrations in aqueous solutions to cure (meth)acrylic-monomer based sealants at the surface of impregnated porosity after aqueous washing of impregnated articles, it is highly surprising and unexpected that the reducing agents which are used in such concentrated solutions could also be used in extremely dilute concentrations (e.g., down to about 0.01 percent by weight, based on the weight of wastewater) to effectively remove (meth)acrylic monomers from aqueous rinsing media produced by washing impregnated porous articles.

The extremely high reduction of monomer and resulting polymer in the wastewater which is achieved by the present invention is a consequence of (1) the adjustment of the wastewater pH to a value in the range of from about 8 to about 10, e.g., by addition of base to the wastewater, and (2) contact of the wastewater with an effective amount of a reducing agent which is polymerizingly effective for the monomer, to yield corresponding polymer from the monomer. The subsequent mixing and flocculation of the pH-adjusted/reducing agent-contacted wastewater with a suitable flocculating agent permits the solids formed in the treated wastewater to be readily physically separated therefrom.

By the process of the invention, it is possible in many instances to remove 75%-95%+ of the monomer content of the original wastewater, as either monomer or resultingly formed polymer.

The removal of monomer and resulting polymer from the aqueous medium, in the practice of the present invention may be further enhanced in some instances, particularly where the monomeric composition contains surfactant or emulsifier components, by treating the monomer-containing wastewater with a de-emulsifier, prior to any substantial polymerization of the monomer as a result of its contacting with the reducing agent. In general, the de-emulsifier will cause a coalescence of the minute emulsified beads of unpolymerized monomer in the aqueous medium. As a result of such coalescence, these beads of unpolymerized monomer will combine to form large emulsion beads in the aqueous medium which, upon polymerization, (1) have a greater tendency to precipitate or drop out of solution due to their increased weight and bulk, and (2) are much more easily filtered from the aqueous medium in the final separation step.

As a result of the above-discussed considerations, the reducing agent concentrations required for effective treatment of monomer-containing wastewater in the practice of the present invention are sufficiently low to minimize reagent requirements for the wastewater treatment, relative to prior art methods in which initiators or other polymerization-inducing materials of various types are added to the wastewater, or are provided in the impregnant composition in the first instance.

Thus, utilizing the illustrative reducing agent materials described hereinabove, a wastewater containing for example from about 0.01% to about 20% by weight monomer, based on the weight of wastewater, may be generally effectively treated at a reducing agent concentration of from about 0.01% to about 2% by weight, based on the weight of wastewater. More preferably, a reducing agent concentration of from about 0.02% to about 1% by weight is employed, and most preferably from about 0.05% to about 0.5% by weight, on the same wastewater weight basis.

For certain of the aforementioned reducing agent materials, very low dosage concentrations may be efficacious. By way of example, when the concentration of (meth)acrylic monomer is from about 0.1% to about 5% by weight, based on the weight of wastewater, sodium erythorbate advantageously may be used in many instances at a concentration of from about 0.05%, or lower, to about 0.15% by weight, based on the weight of wastewater.

In general, the present invention is applicable to the treatment of aqueous media containing (meth)acrylic acid ester monomer(s), e.g., wastewater produced by aqueous rinsing of porous parts impregnated with a (meth)acrylic acid ester monomer composition.

The (meth)acrylic monomer which is present in the aqueous medium treated by the process of the invention, may be a single (meth)acrylate component, or a mixture of different (meth)acrylate species. In any event, the (meth)acrylic constituent of the aqueous medium is effectively polymerized by the particular reducing agent employed, to yield corresponding polymer from the (meth)acrylic monomer. Preferably at least a portion of the (meth)acrylic monomer comprises a di- or other poly(meth)acrylate ester. These polyfunctional monomers produce cross-linked polymers, which serve as more effective and more durable sealants. While various (meth)acrylate monomers may be used, the most highly preferred are poly(meth)acrylate esters which have the following general formula:

wherein: $R^4$ represents a radical selected from the group consisting of hydrogen, lower alkyl of from 1 to about 4 carbon atoms, hydroxyalkyl of from 1 to about 4 carbon atoms, and $R^3$ is a radical selected from the group consisting of hydrogen, halogen, and lower alkyl of from 1 to about 4 carbon atoms; $R^5$ is a radical selected from the group consisting of hydrogen, hydroxyl, and m may be 0 to 12, and preferably from 0 to about 6; n is equal to at least 1, e.g., 1 to about 20 or more, and preferably between about 2 to about 6; and p is 0 or 1.

The polymerizable poly(meth)acrylate esters corresponding to the above general formula are exemplified by, but not restricted to, the following materials: di-, tri- and tetraethyleneglycol dimethacrylate, dipropyleneglycol dimethacrylate; polyethyleneglycol dimethylacrylate; di(pentamethyleneglycol) dimethacrylate; tetraethyleneglycol diacrylate; tetra ethyleneglycol di(chloracrylate); diglycerol diacrylate; diglycerol tetramethacrylate; tetramethylene dimethacrylate; ethylene dimethacrylate; and neopentylglycol diacrylate.

While poly(meth)acrylate esters, especially the poly(meth)acrylate esters described in the preceding paragraphs, are useful in (meth)acrylate-based impregnant compositions, monofunctional (meth)acrylate esters (esters containing one (meth)acrylate group) are also advantageously used.

The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in (meth)acrylate-based impregnant compositions.

When monofunctional (meth)acrylate esters are employed in the impregnant composition, it is preferable to use an ester which has a relatively polar alcohol moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethylmethacrylate.

Other (meth)acrylates can also be used in the porosity impregnation composition and become a component of the wastewater which is treated by the method of the present invention. However, these (meth)acrylates preferably are used in combination with one or more poly(meth)acrylate or monofunctional esters. In impregnant compositions comprising a mixture of mono- and di(meth)acrylates, the mono(meth)acrylate monomer may suitably constitute from about 20 to about 80 percent by weight of the total weight of mono- and di(meth)acrylate monomers. Most preferably, poly(meth)acrylates having the chemical formula given above, comprise at least a portion, preferably at least about 50 percent by weight, of the (meth)acrylates in the impregnant material.

When the (meth)acrylic monomer in the wastewater treated by the method of the present invention derives from a porosity impregnation process, the monomer in the wastewater may be associated with polymerization initiator constituents which under certain conditions, e.g., in the substantial absence of oxygen function to induce polymerization of the monomer(s). The (meth)acrylic monomers employed in such porosity impregnant compositions may be curable through a free-radical mechanism, with an initiator being present therein, or an initiator system comprising a redox polymerization initiator (i.e., an ingredient or a combination of ingredients which produce an oxidationreduction reaction, resulting in the production of free radicals). Suitable initiators may include peroxy materials, e.g., peroxides, hydroperoxides, and peresters, which under appropriate conditions decompose to form peroxy free radicals which are initiatingly effective for the polymerization of the (meth)acrylic monomer.

In addition to initiator components, the impregnant composition which is dispersed in the wastewater being treated may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide; formamide; and compounds containing transition metals, such as copper octanoate.

The impregnant composition may also contain other constituents, such as: other co-monomer species; reactive diluents; pigments; surfactants; fillers; polymerization inhibitors; stabilizers; anti-oxidants; anti-corrosion additives; etc.

The reducing agents which may be usefully employed in the practice of the invention include any suitable materials which are effective to cause polymerization of the (meth)acrylic ester monomer(s) in the wastewater (aqueous medium), containing such monomer(s), and which are chemically reducing in character.

The reducing agent may suitably comprise a material selected from: erythorbic acid, erythorbic acid salts, and other derivatives thereof; ascorbic acid, ascorbic acid salts, and other derivatives thereof; thiourea; sulfite compounds, including sulfites, polysulfites, and metapolysulfites; and mixtures including two or more of the foregoing species.

Preferably, the reducing agent is selected from the group consisting of: erythorbic acid, erythorbic acid salts, erythorbic acid esters, and other erythorbic acid derivatives, as well as mixtures comprising two or more of such materials. The erythorbic acid salts are highly advantageous, and preferably are alkali metal salts of erythorbic acid. A most preferred erythorbic acid salt is sodium erythorbate.

When ascorbic acid compounds are employed as reducing agents in the practice of the invention, potentially useful ascorbic acid salts include alkali metal salts, and potentially useful ascorbic acid derivatives include ascorbic acid esters.

The reducing agent may be contacted with the wastewater in the broad practice of the present invention, before, during, or after the pH of the wastewater is adjusted to the appropriate value, with the proviso that the pH adjustment step preferably is carried out prior to substantial polymerization of the monomer as effectuated by any reducing agent added to the wastewater prior to such pH adjustment. The reducing agent treatment may be carried out by any suitable contacting scheme providing effective dispersal of the reducing agent in the wastewater so that the monomer content is appropriately polymerized by the action of the reducing agent, to yield corresponding polymer from the (meth)acrylic monomer in the wastewater.

It will be appreciated from the foregoing discussion that reducing agent may be introduced to the wastewater before and/or after the pH adjustment, as well as during the pH adjustment. The reducing agent preferably is not added after substantial polymerization of the monomer has taken place, since such subsequent addition is generally non-efficacious and wasteful of the reducing reagent.

The reducing agent may be introduced to the wastewater in the form of an aqueous solution of the reducing agent, and preferably is added in sufficient quantity and at sufficient rate to effect a concentration of from about 0.01% to about 2.0%, based on the weight of wastewater, of the reducing agent in the wastewater. This introduction may suitably be carried out in the presence of gentle mixing, and in the absence of substantial shear conditions, as hereinafter more fully described.

In conjunction with the contacting of the wastewater with reducing agent, the wastewater is adjusted in pH to a value in the range of from about 8 to about 10, more preferably from about 8.5 to about 9.5, and most preferably from about 8.8 to about 9.2. Such pH adjustment may suitably be effected by addition of an appropriate base material to the wastewater.

The pH-adjusting base added to the wastewater may be any suitable base species which is effective to yield the requisite pH adjustment of the wastewater, and which does not preclude the efficacy of the overall process of the invention. Illustrative of potentially suitable base materials are alkali metal hydroxides, and ammonium hydroxide. Among the alkali metal hydroxides, sodium hydroxide and potassium hydroxide are preferred. Ammonium hydroxide is a particularly preferred hydroxide base species, due to the superior settling and dewatering characteristics of the resultingly formed precipitate which are achieved when same is employed.

The pH adjustment may be carried out in any suitable manner to introduce a suitable base material into the wastewater being treated. Thus, a suitable base may be introduced in a solid or powder form under agitation to dissolve the base into the wastewater, or alternatively, the base may be introduced in the form of an aqueous solution of same, under gentle mixing conditions. In any event, the introduction of base is carried out so as to adjust the pH of the wastewater to a value in the broad range of from about 8 to about 10, and more preferably to a value close to 9.0±0.5. in order to achieve this advantages of the present invention after the base has been added, it may be desirable to mix the base-containing water for sufficient time to ensure uniformity of pH conditions for subsequent treatment. As mentioned, the pH adjusting step may be carried out prior to, during, and/or subsequent to the addition of the reducing agent to the wastewater. The pH adjusting step preferably is carried out prior to substantial polymerization of the monomer.

The high pH conditions imparted to the aqueous medium in the method of the present invention have been found to unexpectedly result in (1) improved efficacy of the polymerization of the monomer, and (2) reduced deposition or surface polymerization of the monomer on the walls of the tankage and piping which are in contact with the wastewater, as well as (3) enhancement of the precipitatability (settleability) of the polymerized monomer, relative to corresponding processes in which the pH is at or adjusted to lower values.

While we do not wish to be bound by any theory as regards the mechanism or physical basis for such surprising and unexpected enhancements in the treatment process of the invention, it is our belief that the pH adjustment will have an impact on the degree of polymerization of the monomer as well as the physical and/or ionic characteristics of the polymerized monomer particles. In any event, the pH adjustment has a demonstrable enhancement effect on the polymerization of the monomer and the ability of the polymerized monomer to precipitate or drop out of solution or suspension.

The reducing agent may be added to the wastewater as previously described, and preferably is contacted with the wastewater by gentle mixing of the reaction volume for sufficient time to effectuate the desired extent of polymerization of the monomer in the wastewater. By way of example, in a commercialscale process, the reducing agent may be added to the wastewater in a reaction tank, the contents of which are then stirred under gentle agitation conditions for 30 minutes to 2 hours.

After the requisite pH adjustment and contacting of the wastewater with the reducing agent have been effected, the wastewater may suitably be mixed with a suitable flocculating agent, e.g., a cationic flocculating agent. Such cationic flocculating agent may be added under gentle mixing conditions to the wastewater, in a sufficient quantity to flocculate the polymer in the wastewater, together with any residual monomer that may remain unreacted in the wastewater.

The cationic flocculating agent may comprise any suitable flocculating agent which is cationic in character and efficacious to flocculate the polymer in the wastewater undergoing treatment. Preferably, the cationic flocculating agent is of a type comprising cationic polyacrylamide(s), such as the cationic polyacrylamide flocculating agents available from American Cyanamid Company (Wayne, N.J.) under the trademark MAGNIFLOC, or from Exxon Chemicals Company (Columbus, Ga.) under the trademark JAYFLOC. A particularly preferred material of such type is JAYFLOC 817 (Exxon Chemicals Company), which is a quaternary ammonium cationic polyacrylamide of high molecular weight and high charge density, which is available as a water-in-oil emulsion.

The amount of the cationic flocculating agent which is desirably employed to treat the wastewater in conjunction with the pH-adjustment and reducing agent-contacting steps may be readily determined by those of ordinary skill in the art, without undue experimentation, by the simple expedient of varying the concentration of flocculating agent in corresponding samples of the wastewater being treated, and determining the settling rate of precipitated solids, the gravity dewatering rate of the precipitated solids, and the physical or morphological character of the floc particles which are produced, at the various respective concentrations of flocculating agent.

The adjustment of pH of the wastewater to a value in the range of from about 8 to about 10, in conjunction with contacting the wastewater with an effective amount of the reducing agent to polymerize the monomer, produces a treated wastewater medium in which the addition of the cationic flocculating agent effects the formation of large, well-defined floc and enables the subsequent separation/recovery of superior quality monomer- and polymer-reduced wastewater effluent. For example, when the aforementioned high molecular weight, high charge density quaternary ammonium polyacrylamide material is employed as the cationic flocculating agent, it is possible to employ filtration as the physical separation method for recovering the purified wastewater effluent, to yield a water white liquid which is substantially depleted of monomer and resulting polymer. Thus, it is possible to remove approximately 75%–95%+ of the monomer content of the original wastewater, either as monomer or resultingly formed polymer, by the pH adjustment, reducing agent contacting, and cationic flocculating agent mixing/flocculation steps, in the practice of the present invention.

It may be preferred in some instances to carry out the pH adjustment prior to addition of reducing agent, and with the cationic flocculating agent being mixed with the wastewater after treatment with the reducing agent, and before separation of the polymer and residual monomer from the wastewater.

As a further, optional step in the treatment method of the present invention, as broadly described hereinabove, it may be desirable in some instances to treat the wastewater with de-emulsifying agent(s) prior to substantial polymerization of the monomer in the wastewater. Such de-emulsification treatment of the wastewater has been found to significantly improve the efficiency and efficacy of the wastewater treatment process. In general, the de-emulsifier will cause a coalescence of the minute emulsified beads of unpolymerized monomer in the aqueous solution or dispersion of monomer. By virtue of such coalescence, these emulsified beads will combine to form larger emulsion beads in the wastewater, which, upon polymerization, will have a greater tendency to precipitate or drop out of solution or suspension, due to their increased weight and bulk, and, for the same reasons, are much more easily filtered than solids in corresponding aqueous medium processing not including such de-emulsification treatment.

While any suitable de-emulsifying agent may be employed for such purpose, including a wide variety of commercially available emulsion breakers, coagulating aids, and clarification additives, the de-emulsifiers commercially available under the trademark MAZON® from the PPG/Mazer Chemicals unit of PPG Industries, Inc. (Gurnee, Ill.) are particularly preferred, with MAZON® 80, MAZON® 103, MAZON® 150, MAZON® 720, and MAZON® 799 de-emulsifiers being highly preferred. Among these de-emulsifying agents, MAZON® 150 liquid cationic emulsifier, a cationic polyelectrolyte, has been found to be particularly advantageous and is generally most preferred in practice.

The de-emulsifier may be added to the wastewater undergoing treatment, at any suitable point in the sequence of treatment steps, with the proviso that such agent preferably is added prior to any substantial polymerization of the monomer. Generally, it is preferred to add the de-emulsifier to the wastewater either prior to or subsequent to pH adjustment, with pH adjustment preceding treatment of the wastewater with the reducing agent. Nonetheless, it should be recognized that the sequence of steps may be varied and carried out in any suitable order or sequence. It is generally preferred to carry out the pH adjustment and the de-emulsifier treatment steps prior to any substantial polymerization of the monomer in the wastewater to form the corresponding polymer therein.

The above-described steps of pH adjustment, contacting with reducing agent, and flocculating agent mixing/flocculation, may each be carried out at ambient temperature conditions, e.g., temperatures in the range of 0° F.–100° F., or at other suitable temperatures in the specific treatment system employed. Typically, temperatures in the range of 50° F.–80° F. are usefully employed, and the treatment system is operated without any supplemental heating or other temperature adjustment of the wastewater processed in the treatment system.

The pH adjustment step in the method of the present invention may be carried out with monitoring of the pH of the wastewater via a suitable pH probe, or other means such as sequential tests with pH paper, or in any other suitable manner.

The contacting of the wastewater with reducing agent may be carried out for any suitable period of time which is effective to yield the desired extent of polymerization of the monomer in the wastewater.

The cationic flocculating agent mixing/flocculation step may be carried out for sufficient time to permit suitable flocculating action to be achieved, to produce floc which is suitably settleable and dewaterable in character.

In a like manner, the other treatment steps employed in the method of the present invention may each be carried out for any suitable time or times, as necessary or desirable in a given application of the method of the present invention.

The physical separation of the polymer and residual monomer from the treated wastewater may be effected in any suitable manner, by any appropriate conventional physical separation means and/or methods which are efficacious in removing the polymeric and residual monomeric solids from the wastewater. Such physical separation may potentially usefully be carried out by filtration, utilizing any of various types of filters, such as plate and frame filters, belt filter presses, rotary vacuum filters, and the like. Alternatively, other separation methods may be employed, such as centrifugal separation.

In general, filtration is preferred as a physical separation method for producing a monomer- and polymer-reduced wastewater effluent, and the filters most preferred for such purpose are plate and frame types, or rotary vacuum types. Alternatively, bag filters may be advantageously employed, however it should be recognized that such filters are highly labor-intensive to employ, and that, generally, plate and frame filters, or rotary vacuum filters, are more efficiently utilized.

In the practice of the invention relating to the use of a (meth)acrylic monomer-based impregnant composition to seal porosity in porous parts, the excess impregnant removed from the impregnated parts by aqueous washing produces a wastewater which may be discharged from the washing tank to a holding tank serving as a surge vessel to hold the monomer-containing wastewater for subsequent treatment.

From the holding tank, the monomer-containing wastewater may be passed to an agitated mixing and reaction tank in which (1) base is added to adjust the pH of the wastewater to a value in the range of from about 8 to about 10, and (2) reducing agent is added to the wastewater to effectuate polymerization of the monomer therein. After the requisite polymerization of the monomer has been achieved, the cationic flocculating agent may be mixed with wastewater in sufficient quantity and for sufficient time to flocculate the polymer in the wastewater, following which the above-described physical separation of the wastewater may be carried out to remove polymer and residual monomer therefrom and produce a monomer- and polymer-reduced wastewater effluent.

In the above-described process scheme, the pH adjustment step (1) and reducing agent addition step (2) may be carried out in any suitable order, or contemporaneously, intermittently, or concurrently, with respect to one another, preferably with the pH adjustment being carried out prior to substantial polymerization of the monomer in the wastewater.

Further, as described hereinabove, a de-emulsifier may be added to the wastewater prior to substantial polymerization of the monomer, to improve the efficiency and efficacy of the wastewater treatment process.

It will be appreciated that the holding tank in the process scheme described illustratively above may be deleted to accommodate direct introduction of monomer-containing wastewater from the porous parts washing tank to the mixing and reaction tank, with the specific layout of the process system depending on the size of the mixing and reaction tank, and the flow rate and composition of the wastewater which is discharged from the porous parts washing tank.

As described hereinabove, the reducing agent may be added to the monomer-containing wastewater in any suitable concentration, but typically is added in amounts of from about 0.01 percent to about 2 percent by weight, based on the weight of the wastewater.

When the reducing agent comprises a material such as erythorbic acid, sodium erythorbate, ascorbic acid, ascorbic acid derivatives, thiourea, sodium metabisulfite, sodium sulfite, and the like, the required concentrations can in some instances be extremely low, as for example on the order of from about 0.05 to about 1 percent by weight, and more particularly from about 0.05 percent to about 0.15 percent by weight, on the same wastewater weight basis.

The polymer, once formed, may be flocculated in the mixing and reaction tank after addition of a suitable cationic flocculating agent thereto, at any suitable temperature, e.g., ambient temperature, with gentle agitation. The term "gentle agitation" has reference to the provision of mixing conditions which do not significantly shear the monomer and/or polymer articles, and which do not deflocculate the polymer/monomer solids being aggregated under the action of the flocculating agent. The gentle agitation thus reflects a mixing regime substantially devoid of significant shear forces on the monomer and/or polymer particles, but which provides sufficient mixing to effect good contacting of the monomer and resulting polymer with treatment reagents in the wastewater, and to maintain the monomer and resulting polymer particles in suspension in the aqueous medium of the wastewater.

In order to avoid any anomalous catalytic effects due to the presence of metals, and to preclude sticking of monomer and resulting polymer particles to the vessel walls, the mixing and reaction tank may be formed of a chemically inert material, e.g., polyethylene, polytetrafluoroethylene, or other inert materials. Alternatively, the tank may be lined or otherwise coated with such inert materials, to avoid such anomalous catalytic effects. Catalytic effects of such type may result in an undue extent of polymerization, which renders it disproportionately more difficult to maintain the polymer in suspension in the mixing and reaction tank during contacting of the wastewater with the various reagents.

Thus, a single mixing and reaction tank may be employed for all of the reagent contacting operations, including pH adjustment, reducing agent contacting, cationic flocculant mixing/flocculation, optional de-emulsifier addition, and any other ancillary treatment steps. Such tank may also be used for gravity sedimentation or clarification of the flocculated solids-containing wastewater after the wastewater is treated with the cationic flocculating agent, if the process system is operated in a batch or semi-batch mode. Alternatively, the reagent contacting steps may be carried out in a single mixing and reaction tank, followed by transfer of the wastewater, after cationic flocculant treatment, to a separate physical separation means, e.g., a clarification or sedimentation tank, in which the flocculated solids are separated by gravity from the treated wastewater, or the treated wastewater may be passed to a filter, or to a settling tank followed by a filter, etc.

As a still further alternative, the method of the present invention may be practiced in a continuous flow process system, in which separate treatment vessels are provided for each of the constituent pH adjustment, reducing agent contacting, cationic flocculating agent mixing/flocculation, and optional de-emulsifier contacting steps, so that each of these contacting operations is carried out in a different vessel, followed by physical separation of the polymer-containing wastewater, e.g., by filtering, sedimentation, or other suitable separation methods.

In the practice of the invention in which gravitational solids-liquid separation is effected, the resulting supernatant may be withdrawn and passed to receiving waters, while the sedimented solids may be passed to final filtration, or other separation or further treatment steps.

In most instances in which the process of the invention is employed to process monomer-containing wastewater, the flocculated wastewater resulting from the cationic flocculant treatment may be passed directly to filtration means, such as the filter devices hereinabove illustratively described.

Accordingly, it will be appreciated that the method of the present invention may be carried out in a number of different equipment schemes and process applications, with the choice of the specific apparatus arrangement and process methodology being readily determinable by those skilled in the art, for a given application system. Further, the sizing and operational parameters of such equipment and process systems are within the skill of the art, and may be readily selected based on bench-scale or pilot-scale tests to determine appropriate operating parameters, set-point values, and data for scale-up purposes.

Although the wastewater treatment method of the present invention has been described herein with specific application to the treatment of wastewater containing (meth)acrylic ester monomer(s) as produced by aqueous rinsing of porous parts impregnated with (meth)acrylic monomer-based impregnant compositions, it will be recognized that the broad applicability of the invention is not thus limited, but rather encompasses generally the treatment of aqueous media containing (meth)acrylic monomer(s).

Referring now to the single drawing (FIG. 1), there is shown a schematic flow sheet of a process system for the impregnation of porosity of porous articles, and the treatment of monomer-containing wastewater resulting from water wash removal of excess impregnant from the porous articles, illustrating the application of the invention in one embodiment thereof.

Figure 1:
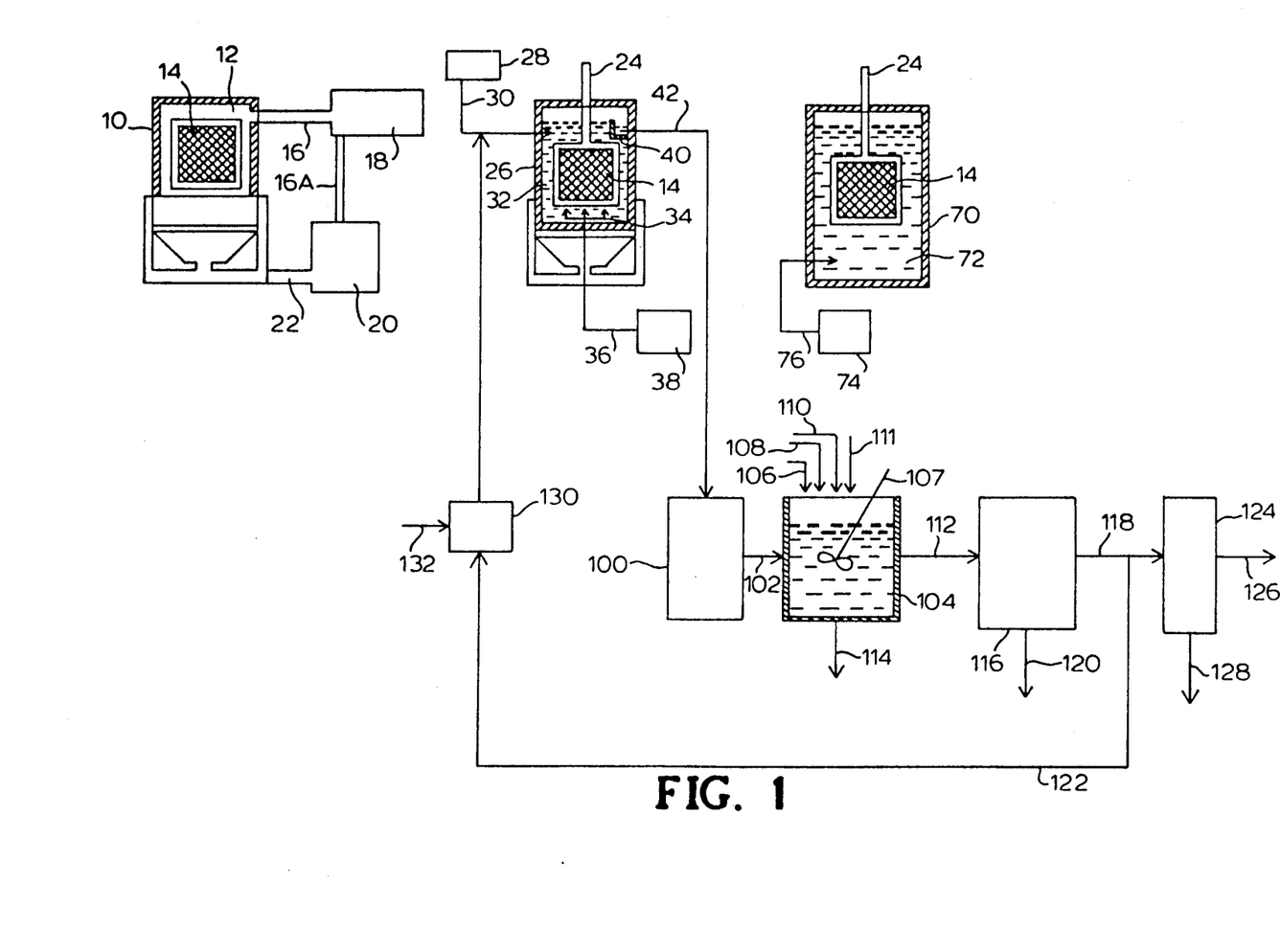
FIG. 1 is a schematic flow sheet of a porosity impregnation and wastewater treatment system according to one embodiment of the present invention.

The porosity impregnation is effected in this embodiment by a so-called "dry vacuum" technique, however it will be recognized that such mode of impregnation is illustrative only, and that the porosity impregnation may be carried out by various other techniques, including "wet vacuum" impregnation and wicking impregnation techniques well known in the art. The choice of various "wet", "dry", or wicking impregnation techniques will depend on a number of factors, including the specific (meth)acrylic monomer-containing impregnant composition, the size, shape, composition and porous character of the porous parts, and the intended end use of the impregnated parts, as will be appreciated by those skilled in the art.

The porosity impregnation and wastewater treatment system in this illustrative embodiment comprises an impregnation chamber 10 having an interior volume 12 in which is disposed basket 14 containing porous metal parts (not shown for clarity).

The impregnation chamber 10 is joined in flow communication via conduit 16 to a vacuum generating means 18, for selectively drawing a vacuum on the impregnation chamber, so that the air therein is withdrawn to evacuate the porosity of the porous parts in the basket and de-aerate the impregnant composition.

Subsequent to the evacuation of the interior volume 12 of the impregnation chamber, impregnant composition stored in reservoir 20 and maintained therein in an aerobic state, at higher pressure than the evacuated impregnation chamber, is flowed in line 22 into the interior volume of the impregnation chamber. The impregnant material may be of any suitable composition, as for example self-curing anaerobic sealants comprising (meth)acrylic monomer(s) which are polymerizable by free radical polymerization in the presence of a suitable free radical initiator and the substantial absence of oxygen, at ambient (e.g., room temperature) conditions, in the absence of any heating of the impregnant composition. Examples of impregnant compositions potentially useful in the broad practice of the invention include those described in the aforementioned U.S. Pat. Nos. 3,672,942; 3,969,552; Re. 32,240, and 4,623,945.

The (meth)acrylic monomer-containing impregnant composition in reservoir 20 may also be deaerated by means of conduit 16A joining the reservoir with the vacuum generating means 18, just prior to transferring the impregnant from the reservoir to the impregnation chamber. The vacuum drawn by the vacuum generating means 18 is discontinued once the impregnant fills the impregnation chamber to the desired extent.

As a result, the impregnant penetrates into the porosity of the porous parts in basket 14. Such hydrostatic impregnation may be further assisted by reversing the vacuum generating means 18 to pressurize the interior volume of the impregnation chamber, to force the impregnant further into small porosity passages.

Subsequent to this impregnation, the impregnant is returned via line 22 to the impregnant reservoir 20. While the impregnant is being returned to the reservoir, the basket 14 may be spun briefly by suitable spinning means (not shown for clarity) to allow centrifugal force to remove the major portion of the impregnant on the exterior surfaces of the porous parts.

Next, the basket containing the impregnated porous parts is removed from the impregnation chamber and transferred, via a suitable support 24 joined to the basket, to the aqueous washing chamber 26, for water rinse removal of excess impregnant from the impregnated porous articles.

The aqueous washing chamber 26 is supplied with clean rinse water by a clean water source 28, from which rinse water is flowed in line 30 into the aqueous wash chamber 26.

The aqueous washing chamber 26 may suitably receive sparged air in a lower portion of the liquid 32 therein, by a sparger 34 joined by air feed line 36 to a compressed air source 38, e.g., a conventional air compressor. The purpose of such air sparging operation is to induce circulatory flow within the wash liquid volume so that residual surface sealant and sealant in shallow surface pores is efficiently removed from the impregnated porous articles in basket 14.

Alternatively, or in addition to the utilization of sparging means as described above, there may be employed in the aqueous washing chamber 26 suitable oscillating and/or tumbling means (not shown) of known conventional type, to maximize the efficiency of removal of the excess impregnant.

As a result of the removal of excess impregnant in the aqueous washing chamber, the wash liquid becomes mixed with the removed impregnant composition. The resulting (meth)acrylic monomer-containing liquid is discharged from the aqueous washing chamber 26 by means of overflow weir 40, or other suitable discharge means, into effluent line 42. Alternatively, a bottom or intermediate withdrawal of the monomer-containing liquid could be effected.

The amount and/or flow rate of effluent aqueous washing medium wastewater in line 42 may be monitored or otherwise controlled, consistent with the rate of introduction of clean rinse water in line 30, as desired, to maintain a highly efficient aqueous washing removal of excess impregnant from the impregnated porous articles in the washing chamber.

The impregnant-containing wastewater discharged in line 42 from the aqueous washing chamber may contain for example from about 0.1% up to about 8–10% by weight, or more, of the (meth)acrylic monomer, based on the total weight of wastewater comprising same, and more typically contains from about 0.1 to about 3% by weight, on the same basis, of the (meth)acrylic monomer.

The impregnant in the effluent wash water typically is in dispersed form, e.g., an emulsified form where the impregnant is self-emulsifying in character, or where surfactants or other emulsification-producing components have been added to the impregnant, and/or to the aqueous washing medium in the wash chamber 26, and/or to the wastewater effluent therefrom.

Subsequent to aqueous washing, the basket 14 of porous parts may suitably be passed to activation chamber 70. The activation chamber contains an aqueous solution 72 of activator material, as supplied from activator reservoir 74 to the chamber in line 76, to cure the impregnant composition at the entrance of the pores in the porous parts. This creates a hardened plug or cap in the outer portion of the pores, trapping the remaining curable composition in the interior pore volume of the porosity for anaerobic self-cure, in the case of impregnant compositions which are anaerobically curing in character.

The activator may be any suitable material which is effective to cure the impregnant at the surface of each porosity. Illustrative of suitable activator species which may be potentially usefully employed in combination with anaerobically-curing and/or heat-curing (meth)acrylic monomer-containing impregnant compositions, are erythorbic acid, sodium erythorbate, ascorbic acid, and ascorbic acid derivatives, thiourea, and sodium metabisulfite, as well as any other efficacious materials which are usefully employed as reducing agents in the broad practice of the present invention, in the treatment of the monomer-containing wastewater.

The concentration of activator in the aqueous solution 72 may suitably be up to about 2% by weight, based on the weight of aqueous solvent, with concentrations on the order of about 1% by weight, on the same weight basis, being generally usefully employed.

Subsequent to the activation step in activation chamber 70, the basket of impregnated porous parts may be removed therefrom and transferred to final rinsing and drying steps.

The (meth)acrylic monomer-containing wastewater from the aqueous rinse chamber is passed in line 42 to holding tank 100. Holding tank 100 functions as a surge vessel, to retain the monomer-containing wastewater for subsequent treatment, and to dampen any fluctuations in flow rate of the wastewater in line 42. The holding tank may, if desired, be gently mixed by suitable agitation means (not shown), to keep the monomeric solids from settling out and causing the formation of anaerobic conditions in localized deposits on the bottom of the vessel.

The monomer-containing wastewater is withdrawn from holding tank 100 in line 102 and is passed to the contacting and reaction tank 104, suitably equipped with an agitator 106 or other suitable means for stirring or gently mixing the contents of the vessel.

The contacting and reaction tank 104 is arranged in receiving relationship to lines 106, 108 110, and 111, for introduction of treatment reagents to the tank. Specifically, base is added to the monomer-containing liquid in tank 104 via conduit 106, to adjust the pH of the wastewater to the required value in the range of from about 8 to about 10. After the base has been added to the mixing and reaction tank, the vessel contents are agitated for a suitable time to disperse the base and effect uniformity of pH conditions in the tank, as for example on the order for about 5 minutes.

Prior to, during, or after establishment of the desired pH condition in the mixing and reaction tank, reducing agent is added to the wastewater from line 108 in an amount which is polymerizingly effective for the monomer, to yield corresponding polymer from the monomer in the wastewater. If the reducing agent is added prior to or during establishment of the desired pH condition in the mixture and reaction tank, the pH condition should be established before any substantial polymerization of the monomer under the action of the reducing agent has occurred, so that the polymerization is substantially carried out under the high pH conditions (in the range of from about 8 to about 10) which unexpectedly have been discovered to permit enhanced polymerization to take place, relative to lower pH conditions.

In this respect, it should be noted that use of an acidic reducing agent may cause the pH of the wastewater to decline, and in some instances, it may be desirable to add base to the wastewater during the polymerization reaction, on a continuous, or intermittent basis, commensurate with the introduction of the acidic reducing agent, so that optimal pH conditions in the aforementioned ranged are maintained. It may also be desirable in some instances to add base to the wastewater after its polymerization treatment, so that the final wastewater effluent is of a suitable pH for discharge to receiving waters.

During the polymerization reaction, the wastewater contents of the contacting and reaction tank are gently agitated by the agitator 106 for a suitable period of time to effect reaction, as for example on the order of about 1 hour.

In order to further enhance the efficacy of the polymerization and subsequent physical separation steps, it may be desirable in some instances to add to the mixing volume in reaction tank 104 a quantity of a suitable de-emulsifier, via line 111. The de-emulsifier may be added at any suitable point (or continuously or intermittently) during wastewater treatment in tank 104, but preferably is added prior to any substantial polymerization of the monomer in the influent wastewater from line 102. Generally, it is preferred to add the de-emulsifier to the wastewater either prior or subsequent to pH adjustment, with such de-emulsifier addition and pH adjustment steps being carried out prior to addition of reducing agent to the wastewater in tank 104.

After the polymerization reaction has been effected to the desired extent in tank 104, a cationic flocculating agent may be added to the wastewater via conduit 110, and the tank thereafter is agitated by the agitator 106 for sufficient time to form the floc in the wastewater volume, which may for example take from about 5 to about 10 minutes. Subsequently, the floc-containing wastewater is passed in line 112 to filter 116 for separation of the floc from the wastewater, with the separated monomer- and polymer-containing solids being discharged from the filter in line 120, and the monomer- and polymer-reduced wastewater effluent being discharged from the filter in line 118.

It may be desirable in some instances, after the flocculation step has been carried out, to discontinue the action of agitator 106 and to allow the floc-containing wastewater to settle in the contacting and reaction tank 104, so that the contacting and reaction tank, after reagent treatment, functions as a settling tank. In such manner, flocculated solids are deposited on the floor of the contacting and reaction tank, and are removed as separated solids underflow in line 114, after settling has taken place to a desired extent. The liquid remaining in the contacting and reaction tank 104 after such discharge of settled solids, then may be transferred from the contacting and reaction tank 104 to the filter 116 via line 112, or else the solids-depleted liquid in line 112 may be passed directly to receiving waters, if the effluent quality thereof is of a sufficient character.

In general, however, it is preferred to pass the floc-containing wastewater directly from the contacting and reaction tank 104 to the filter 116 for solids/liquid separation, with discharge of separated solids from the filter in line 120, and discharge of solids-reduced wastewater effluent from the filter in line 118.

In the addition of the cationic flocculating agent to the treated wastewater in the process of the present invention, and during subsequent mixing to flocculate the polymer in the wastewater, it will be appreciated that the floc formed from the polymer will be shear-sensitive in character, and that continued agitation, even of a gentle character, for extended periods of time can cause the floc to become smaller in size, with concomitantly poorer settleability and dewatering characteristics.

Accordingly, it may be desirable in some instances to continuously or intermittently add the cationic flocculant to the wastewater during flocculation treatment thereof, so that floc formation is optimized, particularly when the subsequent physical separation means (e.g., filter) is operated at a rate necessitating retention of the flocculating wastewater in the contacting and reaction vessel.

In other instances, in which only a short retention time in the contacting and reaction vessel is required, the flocculant may suitably be added in bulk to the wastewater.

The choice and manner of use of the flocculating agent will be readily determinable by those skilled in the art, without undue experimentation. In small-scale, batch-type commercial operations, it is generally desired to gently agitate the wastewater for a short period of time, e.g., 5-10 minutes, after addition of the cationic flocculating agent, to form the floc for filtration. The agitation then is discontinued, and the flocculated wastewater is passed to the filter, or other separating means.

If desired, a portion of the treated wastewater, e.g., the monomer- and polymer-reduced wastewater effluent in line 118, may be recycled in line 122, for addition to the make-up water being introduced from source 28 via line 30 to the rinsing chamber 26.

Such recirculation mode of operation, however, requires that any residual reducing agent in the recycle stream be removed prior to its use in the washing medium in rinsing chamber 26. Such removal of residual reducing agent is necessary since its presence in the rinsing chamber 26 could result in cure of impregnant material on the surface of the impregnated parts during the rinse cycle, rendering such parts deficient or even useless for their intended purpose.

To accommodate recycle of a portion of the monomer- and polymer-reduced wastewater effluent, a removal complex 130 is disposed in recycle line 122. The removal complex 130 may be of any suitable type which is effective to remove the reducing agent from the recycle wastewater. For example, such complex could comprise a bed of a suitable affinity resin or other material which is selective to adsorb the reducing agent. Alternatively, the removal complex 130 may comprise a tank to which a suitable reagent is introduced in line 132 to effect the elimination of the reducing agent from the recycle wastewater stream—such reagent could comprise air or other oxygen-containing gas, or hydrogen peroxide, sodium hypochloride, etc., so as to destroy or neutralize any residual reducing agent, to render the resulting wastewater substantially depleted in the reducing agent and suitable for use in the rinsing chamber 26.

As shown, the monomer- and polymer-reduced wastewater effluent in line 118 may be passed to an ultrafilter 124 for polishing of the effluent via ultrafiltration thereof. The resulting final polished wastewater effluent is discharged from the ultrafilter in line 126, and ultrafiltered solids are discharged from the ultrafilter in line 128.

The wastewater effluent discharged from the process system in line 126 may, as a final step, be further adjusted in pH (by means not shown) to a neutral or other selected value, for discharge to receiving waters. For example, when acidic reducing agents are employed, the pH of the wastewater subsequent to polymerization treatment may decline to a lower value requiring additional pH adjustment for final effluent discharge, or, alternatively, the treated water from the polymerization treatment may retain an elevated pH condition, such that acidic pH-adjusting reagents are desirably added to achieve a desired discharge pH condition in the wastewater.

The filter 116 in the process system described hereinabove may be of any suitable type, including, for example, plate and frame filters, rotary vacuum filters, bag filters, etc., or, alternatively, other solids/liquid separation equipment, such as centrifuges, or belt filter presses, may be utilized. Preferably, a filter is employed, and the filter preferably is of a plate and frame type, or a rotary vacuum type.

In order to enhance the filterability of the polymer-containing wastewater, it may be desirable in some applications of the present invention to utilize filtration aids or other additives to enhance the separation efficacy of the process and to produce a treated wastewater effluent containing minimal solids. Examples of filtration aids which may potentially be usefully employed in the practice of the invention include diatomaceous earth, powdered activated carbon, etc.

Although the prior art has utilized activator (reducing) agents to harden impregnant materials at the entrances of porosity of porous articles, such use of activator is markedly different from, and non-suggestive of, utilizing a very small concentration, e.g., from about 0.01% to about 0.15% by weight of reducing agent, in the pH adjustment/polymerization method of the present invention, to achieve effective removal of monomer and resulting polymer from the wastewater.

The fact that very small concentrations of reducing agent may be usefully employed under pH 8 to pH 10 conditions to produce flaky precipitate crystals of polymer from the (meth)acrylic monomer in the porosity impregnation wastewater, which are easily suspended with minimal agitation, and which readily flocculate in the presence of a cationic flocculating agent to form a floc amenable to efficient separation with conventional filtration or other physical separation methods, with high removal levels of monomer, e.g., on the order of 75-95%+, and without any agglomerated or sticky residue, is wholly unexpected, and achieves a fortuitous matching of (1) reducing agent species which are otherwise usefully employable as activator components, and (2) the need to remove monomer from the wastewater in an efficient, simple, and economic manner.

The features and advantages of the present invention are more fully shown by the following non-limiting examples, wherein all parts and percentages are by weight, unless otherwise expressly stated.

EXAMPLE I

Seven hundred liters of wastewater containing 1.5% by weight, based on the weight of the wastewater, (1% by volume) of Resinol RTC (Loctite Corporation, Hartford, Conn.), a (meth)acrylic monomer-containing impregnant material, were flowed to a 750 liter open-top plastic vessel constituting the contacting and reaction tank.

This tank was equipped with an air-driven variable speed agitator, a pH control system, and two variable speed positive displacement metering pumps.

Associated with the contacting and reaction tank were a plastic 75 gallon open-top wash surge tank, two plastic 50-gallon closed-top chemical storage tanks, and a Komline-Sanderson rotary vacuum filter.

The resin-containing wastewater in the contacting and reaction tank was adjusted to a pH value of 8.5-9 by addition of 400 milliliters of 8% (2N) sodium hydroxide aqueous solution under gentle agitation conditions.

After homogeneous pH had been achieved in the wastewater, a 10% aqueous solution of sodium erythorbate was added to the contacting and reaction tank in an amount yielding a concentration of sodium erythorbate in the wastewater of 0.1% by weight, based on the weight of wastewater.

After this addition of sodium erythorbate, the gentle agitation initiated during the pH adjustment step was continued for 1 hour. During the ensuing polymerization reaction, the pH of the reaction volume of wastewater decreased to a value in the range of 6.8-7.2.

With agitation continuing, 9.5 liters of a 0.5% solids aqueous solution of Jayfloc 817 polymer (Exxon Chemicals Company, Columbus, Ga.) was added over a period of 3-5 minutes. After the addition of the polymer solution, agitation of the batch of wastewater was continued for 5 minutes, resulting in the formation of large, rapidly settling floc.

The solids were fed by gravity to the Komline-Sanderson rotary vacuum filter, utilizing as the filter cloth a 1×4 weave sateen finish polypropylene cloth rated at 125 cubic feet per minute (CFM). This rotary vacuum filter, which was equipped with a Flexibelt discharge, produced a filtered solids cake having a thickness of $\frac{1}{4}-\frac{3}{8}$ inch, at a filtration rate in excess of 1 gallon/minute/square foot. Cake discharge was excellent, with no filter cloth blinding being evident. Total solids were in the 20-25% range, with no free moisture on squeezing.

Four separate runs were made using this process system, with identical results being obtained each time.

EXAMPLE II

A 2% by weight (meth)acrylic resin dispersion in water (resin concentration based on the total weight of the water dispersion) was tested for responsivity to various base species employed for pH adjustment purposes. Using corresponding quantities of the resin/water dispersion, pH was adjusted in the respective samples using sodium hydroxide, ammonium hydroxide, or potassium hydroxide. An unadjusted 2% resin/water dispersion was employed as a control.

Of the various bases, ammonium hydroxide formed the best settling floc and had the highest dewatering rate. It also had the lowest pH reduction after 1 hour, being at a pH value of 9.1 initially and after 1 hour declining to a pH of 8.6. The potassium hydroxide and sodium hydroxide pH-adjusted samples each followed a generally similar pH profile, being at an initial pH of 9 and after 1 hour exhibiting pH in the range of 7.1-7.2.

EXAMPLE III

Jar tests were performed on 2% by weight (meth)acrylic monomer aqueous dispersions (monomer concentration based on total weight of the aqueous dispersion) which were pH-adjusted with sodium hydroxide to a pH of 9. A corresponding pH-unadjusted sample was used as a control.

The samples were treated with sodium erythorbate to provide a 0.1% concentration of the reducing agent in the monomer-containing water, following which Jayfloc 817 cationic flocculating agent (Exxon Chemicals Company (Columbus, Ga.)) was added in a sufficient quantity to flocculate the polymer in the treated monomer-containing water.

The addition of the flocculant to the control (pH-unadjusted) monomer-containing water had a detrimental effect on settleability and dewatering of the treated material. By contrast, the addition of cationic flocculant to the pH 9 adjusted material resulted in a spectacular improvement. Large well-defined floc was formed which upon settling produced a water white supernatant. The floc was nor-tacky, did not stick to any of the surfaces of the jar, and filtered at a rate of 6-7 times the filtration rate obtained when such flocculant was not employed. In addition, in corresponding experiments performed without addition of the cationic flocculant, gravity filtration essentially stopped by the sixth minute, whereas filtration still continued after six minutes in the cationic flocculant-treated material.

A sample of the supernatant from the cationic flocculant-treated material was analyzed for chemical oxygen demand (COD), indicating a 75-85% removal relative to the starting monomer-containing water.

EXAMPLE IV

One percent and two percent by weight water dispersions of (meth)acrylic resin (concentration of resin based on total weight of water dispersion) were prepared, and the pH of each was adjusted to 9. After pH adjustment, corresponding samples at each of the concentration levels were treated with reducing agent, to provide a 0.1% concentration of the reducing agent in the aqueous dispersion. One sample was treated with sodium erythorbate as the reducing agent, and the other was treated with erythorbic acid, at each of the respective resin concentrations. After treatment with Jayfloc 817 polymer (Exxon Chemicals Company, Columbus, Ga.), the final pH of the samples treated with erythorbic acid were in the range of 4.3-4.5, whereas the corresponding samples treated with sodium erythorbate were at a final pH of 7.1-7.2.

This comparison shows that if erythorbic acid (or alternatively, ascorbic acid, or other acidic reducing agent) is employed, a final pH-adjustment step may be necessary, so that the final monomer- and polymer-reduced wastewater effluent is of a suitable pH character for discharge thereof to receiving waters.

EXAMPLE V

A series of tests was conducted to determine whether the sequence of addition of pH adjustment and reducing agent addition steps is critical to the achievement of effective treatment of (meth)acrylic monomer-containing water.

A 2% aqueous solution of catalyzed Resinol ® RTC (comprising t-butyl hydroperoxide as in initiator and saccharin as an accelerator) was made up in 30°-35° C. tap water to obtain 500 grams of solution having a pH of 6.0. The solution was made up in a 1 liter beaker, which was stirred with a mechanical mixer at 800-1500 rpm. To this solution was added in a dropwise fashion sufficient sodium hydroxide (48-50 drops, 2.0 gm. of 0.5N sodium hydroxide solution) to raise the pH of the resin-containing solution from a pH of 6.0 to a pH of 9.0.

A 10% solution of sodium erythorbate (5.0 gm) then was added to the aqueous monomer solution, and thereafter the monomer-containing solution was stirred for 1 hour.

Following such stirring, a 0.5% solution of Jayfloc 817 was added to the reaction volume and stirred for 5-10 minutes, then set aside for subsequent filtration.

The above-described procedure (hereafter called Procedure 1) was carried out in a sequence comprising initial pH adjustment, followed by reducing agent addition, and finally treatment with flocculating agent.

In Procedure 1, when the sodium erythorbate was added to the solution, reaction occurred, resulting in medium-sized precipitate particles being formed. When the flocculating agent was added, coagulation occurred. Separation of the treated liquid, after addition of the flocculating agent and stirring thereof, was moderate at about 60-90 minutes after dosing with the flocculant. Filtration was slow, with an abundant precipitate having medium particle size. Net dry solids from the treated liquid had a weight of 8.5 gm.

In Procedure 2, the sodium erythorbate and sodium hydroxide solution were added concurrently to the monomer-containing liquid after pH adjustment of the liquid to pH 9.0. The separation of the treated liquid on standing was consistent with that observed in Procedure 1, with two separation phases resulting. The particle size of the precipitate was commensurate with that observed in Procedure 1. Filtration was slow, with an abundant precipitate of medium particle size, and the net dry solids weighed 7.8 gm.

In Procedure 3, pH adjustment was carried out, when the sodium erythorbate had already been added to the monomer-containing wastewater, in a prompt manner so that no significant polymerization of the monomer had taken place. Settling of the treated liquid occurred over 45-60 minutes, with the separation of two phases, and a large particle size of the precipitate, being observed. Filtration was better than that achieved in Procedures 1 and 2. Net dry solids weighed 8.7 gm.

In Procedure 4, the process of Procedure 1 was repeated, but with the addition of a 0.5% solution of Mazon ® 150 being added to the monomer-containing liquid prior to pH adjustment thereof. The formation of a large particle-sized precipitate was noted after addition of the sodium erythorbate. Separation was slow, and the solution remained cloudy. Net dry solids on filtration were 7.6 gm.

In Procedure 5, the same de-emulsifier solution of Mazon ® 150 used in Procedure 4 was employed, but the de-emulsifier solution was added after pH adjustment to pH 9.0. No difference in settling behavior was observed, relative to Procedure 4. Separation on settling was slow, and filtration was slow. The net dry solids obtained in Procedure 5 weighed 8.0 gm.

As shown by the foregoing, Procedure 3 yielded slightly better results than the standard Procedure 1. The sequence of pH adjustment and reducing agent addition steps has little effect on the treatment process in these test compositions.

EXAMPLE VI

A 1.5% w/w solution of Resinol ® RTC (meth)acrylic impregnant composition was made up in 40°-45° C. tap water, which then was stirred by mechanical stirring means at a speed of 115 rpm. A 0.7% w/w solution of MAZON ® 150 de-emulsifier (800 ml of L solution) was added to 200 ml of the impregnant composition-containing solution, by means of an addition funnel, over approximately 1.5 hours, at a rate of approximately 8-10 cc of de-emulsifier solution per minute.

After the first 100 ml of de-emulsifier solution had been added to the impregnant-containing solution, sodium erythorbate, previously dissolved in a small amount of water, was added to the impregnant-containing solution in ar amount equivalent to 0.1% by weight, based on the original 200 ml of the impregnant-containing solution. Next the remaining de-emulsifier solution was added, and the resulting solution was stirred for about 30-45 minutes, then set aside at room temperature, with a solution pH of 5-6.0.

The above-described procedure (hereafter called Procedure A) exhibited fast reaction of the monomer upon introduction of the reducing agent. Good separation was observed, and precipitation was abundant with a large particle size. The product was filtered and dried in a hood at room temperature, yielding 4.5 gm of net dry solids.

Procedure A was repeated, but with 0.7%, 2.0%, and 3.0% solutions of the impregnant in water, and at de-emulsifier concentrations of 0.75%, 1.0%, and 1.5%, with good results.

In addition, various other de-emulsifiers were utilized in corresponding tests—Mazon ® 80, 103, 720, and 799. Mazon ® 150 de-emulsifier gave the best results, relative to the other deemulsifiers tested, in achieving rapid de-emulsification and minimizing the overall process time.

Although the invention has been described with reference to specific aspects, features, and embodiments, it will be appreciated that the invention is not thus limited, and that other modifications, variations, and embodiments are possible. Accordingly, the invention is to be broadly construed to encompass all such alternative modifications, variations, and embodiments.

What is claimed is:

1. A method of treating wastewater comprising an aqueous medium containing (meth)acrylic monomer, comprising:
   (a) adjusting the pH of the aqueous medium to a value in the range of from about 8 to about 10, by addition of base thereto;
   (b) contacting the aqueous medium with an effective amount of a reducing agent which is polymerizingly effective for the monomer to yield corresponding polymer from the monomer;
   (c) mixing a cationic flocculating agent with the aqueous medium, in sufficient quantity to flocculate the polymer in the aqueous medium; and
   (d) physically separating the polymer-containing aqueous medium and recovering a monomer- and polymer-reduced aqueous medium effluent.

2. A method according to claim 1, wherein the amount of reducing agent contacted with the aqueous medium is from about 0.01% to about 2.0%, by weight based on the weight of the aqueous medium.

3. A method according to claim 1, wherein the concentration of monomer in the aqueous medium is from about 0.01% to about 20% by weight, based on the weight of wastewater.

4. A method according to claim 1, wherein the mixing of the cationic flocculating agent with the aqueous medium is carried out under gentle agitation conditions.

5. A method according to claim 1, wherein the reducing agent is selected from the group consisting of:
   (i) erythorbic acid, salts, and derivatives thereof;
   (ii) ascorbic acid, salts, and derivatives thereof;
   (iii) thiourea; and
   (iv) sulfite compounds; and
   (iv) mixtures thereof.

6. A method according to claim 1, wherein the reducing agent comprises an alkali metal salt of erythorbic acid.

7. A method according to claim 1, wherein the reducing agent comprises sodium erythorbate.

8. A method accord to claim 1, wherein the reducing agent comprises a sulfite compound.

9. A method according to claim 8, wherein the sulfite compound comprises a compound selected from the group consisting of alkali metal sulfites, bisulfites, and metabisulfites.

10. A method according to claim 1, wherein step (a) is carried out before step (b).

11. A method according to claim 1, wherein step (c) is carried out after step (b), but prior to any substantial polymerization of the monomer.

12. A method according to claim 1, wherein steps (a) and (b) are carried out concurrently.

13. A method according to claim 1, wherein pH is adjusted to a value in the range of from about 8.5 to about 9.5 in the pH adjusting step.

14. A method according to claim 1, wherein the cationic flocculating agent comprises a cationic polyacrylamide.

15. A method according to claim 1, wherein the base is selected from the group consisting of sodium hydroxide, ammonium hydroxide, and potassium hydroxide.

16. A method according to claim 1, wherein the physical separation of the polymer-containing aqueous medium comprises filtration.

17. A method according to claim 1, comprising treating the aqueous medium with a de-emulsifier which is coalescingly effective for the monomer, prior to substantial polymerization of the monomer.

18. A method according to claim 1, wherein monomer- and polymer-reduced aqueous medium effluent is treated to remove residual reducing agent therefrom and then recirculated and used as a rinsing medium for washing of impregnated porous parts.

19. A method of treating wastewater comprising an aqueous medium containing (meth)acrylic monomer, comprising:
   (a) adjusting the pH of the aqueous medium to a value in the range of from about 8 to about 10, by addition of base thereto;
   (b) contacting the aqueous medium with an effective amount of a reducing agent which is polymerizingly effective for the monomer to yield corresponding polymer from the monomer; and
   (c) physically separating the polymer-containing aqueous medium and recovering a monomer- and polymer-reduced aqueous medium effluent.

* * * * *

UNITED STATES PATENT AND TRADEMARK OFFICE
CERTIFICATE OF CORRECTION

PATENT NO.  : 5,135,663
DATED       : August 4, 1992
INVENTOR(S) : Frederick F. Newberth, III, et al It is certified that error appears in the above-identified patent and that said Letters Patent is hereby corrected as shown below:

Title page, item [56], under Other Publications, line 2, change "Impregan ion" to --Impregnation--.
Line 4, change "Determinatin" to --Determination--.

Column 1, line 13, change "assigne" to --assignee--.
    Column 1, line 54, change "freeradical" to --free-radical--.
    Column 1, line 56, change "thermal- Curing" to --thermal-curing--.
    Column 6, line 9, change "INvENTION" to --INVENTION--.
    Column 10, line 66, change "oxidationreduction" to --oxidation-reduction--.
    Column 11, lines 20-21, change "emp oyed" to --employed--.
    Column 13, line 8, change "commercialscale" to --commercial-scale--.
    Column 25, line 2, change "nor-tacky" to --non-tacky--.
    Column 25, line 46, change "in" to --an--.
    Column 26, line 63, change "ar" to --an--.
    Column 27, line 15, change "deemulsifiers" to --de-emulsifiers--.

Signed and Sealed this

Thirty-first Day of August, 1993

Attest:

BRUCE LEHMAN

*Attesting Officer*  *Commissioner of Patents and Trademarks*